(12) United States Patent
Zhang et al.

(10) Patent No.: US 11,904,348 B2
(45) Date of Patent: Feb. 20, 2024

(54) SELF-TRACTION WIRE COATING ROBOT AND WIRE ROUTING AND WIRE HANGING METHOD

(71) Applicant: Guangdong Crownpower Electric Power Science And Technology Development Co.Ltd, Guangdong (CN)

(72) Inventors: Wanqing Zhang, Guangdong (CN); Zhijan Huang, Guangdong (CN); Binchang Lai, Guangdong (CN)

(73) Assignee: Guangdong Crownpower Electric Power Science And Technology Development Co., Ltd. (CN)

( * ) Notice: Subject to any disclaimer, the term of this patent is extended or adjusted under 35 U.S.C. 154(b) by 0 days.

(21) Appl. No.: 17/642,846

(22) PCT Filed: Mar. 23, 2020

(86) PCT No.: PCT/CN2020/080608
§ 371 (c)(1),
(2) Date: Mar. 14, 2022

(87) PCT Pub. No.: WO2021/120435
PCT Pub. Date: Jun. 24, 2021

(65) Prior Publication Data
US 2022/0395852 A1    Dec. 15, 2022

(30) Foreign Application Priority Data

Dec. 17, 2019  (CN) .......................... 201911297046.3
Mar. 23, 2020  (WO) ................ PCT/CN2020/080608

(51) Int. Cl.
*B05C 5/02*  (2006.01)
*B05C 11/10*  (2006.01)
(Continued)

(52) U.S. Cl.
CPC ........ *B05C 5/0241* (2013.01); *B05C 11/1002* (2013.01); *B05C 13/00* (2013.01);
(Continued)

(58) Field of Classification Search
USPC .......................... 118/323, 325, 321, 313, 315
See application file for complete search history.

(56) References Cited

U.S. PATENT DOCUMENTS

2002/0058143 A1*  5/2002  Hunt ..................... C23C 16/453
                                                            428/480

FOREIGN PATENT DOCUMENTS

| CN | 203791106 U | * | 8/2014 |
| CN | 2018108718511 | | 12/2018 |
| CN | 2018204774490 | | 7/2019 |

* cited by examiner

*Primary Examiner* — Yewebdar T Tadesse (57) ABSTRACT

The present disclosure provides a self-traction wire coating robot and a wire routing and wire hanging method, wherein the robot includes a mounting plate, a material pushing module, a winding traction module, a coating module, a walking module and a power supply and control module, wherein the coating module and the walking module are rotatable in the extension direction of the non-overhead bare wires, when hanging wires, the coating module and the walking module are first rotated and swung to the side of the robot, an unmanned device is then used to hang a traction belt on the overhead bare wires, the winding traction module tightens the traction belt to hang the robot under the overhead bare wires, and then the coating module and the walking module are controlled to rotate and recover to the top of the robot and hang the robot on the overhead bare wire.

6 Claims, 5 Drawing Sheets

(51) Int. Cl.
*B05C 13/00* (2006.01)
*B05D 7/20* (2006.01)
*B25J 11/00* (2006.01)
*B61B 7/06* (2006.01)
*H02G 1/16* (2006.01)
(52) U.S. Cl.
CPC ............. *B05D 7/20* (2013.01); *B25J 11/0075* (2013.01); *B61B 7/06* (2013.01); *H02G 1/16* (2013.01)

FIG. 9

SELF-TRACTION WIRE COATING ROBOT AND WIRE ROUTING AND WIRE HANGING METHOD

TECHNICAL FIELD

The present disclosure relates to the field of automatic robots, and in particular to a self-traction wire coating robot for insulation spraying of overhead bare wires and a wire routing and wire hanging method used by the robot.

BACKGROUND ART

The early overhead power lines generally used bare wires. Kites, plastic sheets and other sundries hang on the power lines by accident, and mud flow formed by the collected dust on insulators during storms or heavy rains can easily cause short circuit between high-voltage power lines, thus causing accidents such as unexpected power failure.

In order to effectively solve this traditional technical problem, the bare wire is mainly sprayed in the industry. At present, manual spraying is widely used, which has the disadvantages of low efficiency, slow speed, poor quality and poor insulation effect. In addition, manual spraying can easily lead to accidental poisoning and casualties.

Therefore, it has gradually become the main practice in the industry to use the coating robot to spray the overhead bare wire, and the research on the coating robot and the coating method has also gradually achieved certain results, such as the technical solutions recorded in the patent specifications of ZL2018204774490 and ZL2018108718511. However, the above two existing technologies still need to mount the robot on the overhead bare wire by manually climbing to a high place. Then, the automatic spraying operation is carried out. This method is complicated to operate, requires a large number of devices, and affects the spraying efficiency. At the same time, it requires workers to climb high and low, and there is a certain potential safety hazard.

Therefore, there is still much room for improvement in the prior art.

SUMMARY

Based on the above problems existing in the prior art, the present disclosure provides a self-traction wire coating robot and a wire routing and wire hanging method, wherein the robot comprises a mounting plate, a material pushing module, a winding traction module, a coating module, a walking module and a power supply and control module, wherein the coating module and the walking module are rotatable in the extension direction of the non-overhead bare wires, when hanging wires, the coating module and the walking module are first rotated and swung to the side of the robot, an unmanned device is then used to hang a traction belt on the overhead bare wires, the winding traction module tightens the traction belt to hang the robot under the overhead bare wires, and then the coating module and the walking module are controlled to rotate and recover to the top of the robot and hang the robot on the overhead bare wire. The robot provided by the present disclosure solves the problem in the prior art that the robot needs to be manually climbed or mounted with the aid of large-scale tools, and has the advantages of high spraying efficiency, safety, simple auxiliary equipment required and the like. Moreover, the traction belt and the shell are made of insulating materials, so that the robot can work at the same time with or without power failure.

The present disclosure achieves the above object through the following detail technical scheme.

a self-traction wire coating robot, comprising a mounting plate, a material pushing module, a winding traction module, a coating module, a walking module 5 and a power supply and control module;

wherein the winding traction module comprises a spool driven by a winding motor and a bracket; the winding traction module is fixed on the upper surface of the mounting plate through the bracket;

the walking module comprises a wire routing wheel driven by a wire routing motor and a mounting bracket, and the walking module is rotatably provided on the upper surface of the mounting plate through the mounting bracket;

the coating module comprises a pair of semi-sprayers which are fixedly or rotatably mounted on a first walking module at one end of the robot or on the mounting plate through a mounting seat, and the pair of semi-sprayers are driven by a folding motor to be folded with each other to form a complete sprayer;

the material pushing module is fixedly provided on the mounting plate and is communicated with the pair of semi-sprayers of the coating module through paint pipes; the power supply and control module is fixedly provided on the mounting plate and is electrically connected to the material pushing module, the winding traction module, the coating module and the walking module.

A plurality of groups of winding traction modules are provided, each group of winding traction modules comprises two winding traction modules symmetrically or center-symmetrically provided on both sides of the upper surface of the mounting plate; each winding traction module comprises a correcting shaft, a spool, a wire blocking disc, a bracket and a winding motor, the bracket is fixedly mounted on the upper surface of the mounting plate, the winding motor is mounted at one side of the bracket and the power output end thereof is in transmission connection with the spool rotatably mounted in the bracket and drives the spool to rotate; the wire blocking disc is fixedly mounted at both ends of the spool and rotate with the rotation of the spool; the correcting shaft is fixedly mounted at the lower part of one side of the bracket and is parallel to the spool.

A plurality of walking modules are provided and are rotatably mounted at both ends of the mounting plate symmetrically or center-symmetrically, each walking module comprises a telescopic rod, a mounting bracket, a wire routing motor, a wire routing wheel and a wire hanging frame push plate, the lower end of the mounting bracket is rotatably mounted on the upper surface of the mounting plate; the lower end of the telescopic rod is rotatably mounted on the upper surface of the mounting plate, the telescopic rod is closer to the edge of the mounting plate in the rotating direction with respect to the mounting bracket, the upper end of the telescopic rod is rotatably mounted on the upper part of the side of the mounting bracket, the telescopic rod drives the mounting bracket to rotate to one side of the edge of the mounting plate through its own stretch; the wire routing motor is fixedly mounted in the mounting bracket, the wire routing wheel is rotatably mounted on the top of the mounting bracket, the wire routing motor is in transmission connection with the wire routing wheel through a transmission structure and drives the wire routing wheel to rotate; the wire hanging frame push plate is fixedly mounted on the top of the mounting bracket and blocks the wire routing wheel, and the wire routing wheel limits the overhead bare wires in advance.

A pair of semi-sprayers of the coating module comprise a fixed semi-sprayer and a movable semi-sprayer, the fixed semi-sprayer comprises a mounting seat, a nozzle upper wire routing wheel mounting frame, a nozzle upper frame, an upper spraying head and a nozzle upper wire routing wheel; the movable semi-sprayer comprises a lower spraying head, a nozzle lower frame, a nozzle line pressing module and an adjusting nut; the mounting seat is rotatably connected to the mounting bracket of the walking module near one end in the direction of the front end of the robot, the nozzle upper wire routing wheel mounting frame is fixedly mounted below the mounting seat, the nozzle upper frame is mounted at the rear end of the nozzle upper wire routing wheel mounting frame; the upper spraying head is fixedly mounted on the mounting position at the rear end of the nozzle upper frame; the folding motor is fixedly mounted on the upper part of the nozzle upper wire routing wheel mounting frame and is in transmission connection with a folding screw rod to drive the folding screw rod to rotate; the folding screw rod penetrates through the nozzle upper wire routing wheel mounting frame and the nozzle lower frame which is located just below the nozzle upper wire routing wheel mounting frame and is connected to the nozzle lower frame through threads, one side or both sides of the folding screw rod is/are provided with a limit sliding rod which is parallel to the folding screw rod and penetrates through the nozzle upper wire routing wheel mounting frame and the nozzle lower frame, the limit sliding rod is slidably connected to the nozzle lower frame, the upper end of the limit sliding rod is fixedly connected to the nozzle upper wire routing wheel mounting frame, the folding screw rod is driven by the folding motor to rotate and cooperate with the limit sliding rod, thereby driving the nozzle lower frame to be folded with the nozzle upper frame and realizing the cooperation of the lower spraying head and the upper spraying head; the lower spraying head is mounted at the mounting position of the rear end of the nozzle lower frame; the nozzle upper wire routing wheel is fixedly mounted in the nozzle upper wire routing wheel mounting frame, the nozzle wire pressing module is movably mounted in the nozzle lower frame up and down, the nozzle upper wire routing wheel and the nozzle wire pressing module are respectively slidably connected to the upper part and the lower part of the bare wire when in operation; the adjusting nut is connected to the nozzle lower frame through thread penetration, the top of the adjusting nut is in contact with the top of the nozzle wire pressing module, and the adjusting nut adjusts the height of the nozzle wire pressing module through a screw.

The power supply and control module comprises a wireless communication module and a microprocessor, the microprocessor is communicatively connected to the wireless communication module, the material pushing module, the winding traction module, the coating module and the walking module and is communicated with an electronic device of each module, and controls the operation of each module in coordination, the wireless communication module is connected to the remote controller through wireless signals; the material pushing module comprises a material cylinder plug, a paint tank, a material pushing piston, a material pushing motor, a material pushing screw and a fixing frame, the fixing frame is mounted on the lower surface of the mounting plate, the material pushing motor is fixedly installed at one side of the fixing frame, the power output end of the material pushing motor passes through the fixing frame and drives the material pushing screw rod to stretch back and forth through a gear; the material pushing screw rod is slidably mounted on the fixed frame, one end of the material pushing screw rod is fixedly mounted with a material pushing piston, the paint tank is mounted in the fixed frame in front of the material pushing piston, the material pushing piston is driven by the stretch of the material pushing screw rod to push the inner piston of the paint tank, the paint in the paint tank is extruded into a paint pipe; the paint tank of the material pushing module is provided with a paint pipe, and the paint pipe is connected to the paint inlet of a pair of semi-sprayers of the coating module.

The self-traction wire coating robot further comprises a set of mechanisms for controlling the pitch angle of the coating module, and specifically comprises a pitch motor, a nozzle pitch twisting wheel and a coating module mounting frame, wherein the pitch motor is mounted on the top of the mounting bracket of the first walking module at one end of the robot and is in transmission connection with the nozzle pitch twisting wheel, one side of which is rotatably installed on the mounting bracket; the nozzle pitch twisting wheel is provided with a nozzle pitch stay wire, one end of the nozzle pitch stay wire is wound around the nozzle pitch twisting wheel, and the other end thereof is fixedly connected to the coating module mounting frame to drive the coating module mounting frame to rotate up and down; one end of the coating module mounting frame is fixedly connected to the mounting seat, and the other end thereof is rotatably mounted on the mounting bracket coaxially with the wire routing wheel of the walking module.

The self-traction wire coating robot further comprises a shell, which is fixedly mounted on the mounting plate and wrapped outside the whole robot.

A wire routing and wire hanging method of a self-traction wire coating robot comprises the following steps: first, rotating and swinging the walking module to the side of the robot, using an unmanned device or directly hanging the traction belt on the overhead bare wire through a long insulating rod, tightening the traction belt using the winding traction module to hang the robot under the overhead bare wires, and finally controlling the walking module to rotate and recover to the top of the robot, then releasing the traction belt until the nozzle of the coating module and the wire routing wheel of the walking module are completely clamped to the wire, and hanging the robot on the overhead bare wire, comprising the following detailed steps:

step S10, hanging the traction belt: using an unmanned device or directly hanging the traction belt on the overhead bare wire through a long insulating rod, and then fixing both ends of the traction belt to the winding traction module, preferably using an unmanned aerial vehicle, wherein the unmanned aerial vehicle can be directly controlled to carry the traction belt across the overhead bare wire, and the crawling operation of crawling robot device depends on wire poles or wire racks, etc., which has relatively high requirements on the construction site and is subject to more restrictions; the long insulating rods have greater restrictions on the height and are inconvenient to operate; a wire hanger can pass through the traction belt, the wire hanger is connected to the bare wire along with the traction rope, and the traction rope is separated from the bare wire to prevent the traction rope from being abraded and damaged during the formal operation of the robot;

step S20, preparation before hanging: rotating and swinging the walking module and turning on the nozzle of the coating module, so as to avoid that the coating module and the walking module touch the overhead bare wires during the ascent of the robot and influence the ascent process, and connecting the discharge port in the material pushing module to a paint interface of the coating module using a paint pipe;

step S30, hanging: starting the winding traction module to tighten the traction belt, so that the robot rises below the overhead bare wire with the tightening of the traction belt, and the nozzle upper wire routing wheel of the coating module and the wire routing wheel of the walking module are higher than the overhead bare wire;

step S40, wire routing: controlling the walking module to rotate and recover right above the overhead bare wire, and gradually releasing the traction belt by the winding traction module so that the nozzle upper wire routing wheel and the wire routing wheel are clamped on the overhead bare wire; and folding the nozzle lower frame of the coating module until the upper spraying head and the lower spraying head are folded.

Step S10 further comprises step S11 of preparation before coating: according to the situation of the overhead bare wire and the coating robot, selecting a suitable nozzle and adjusting the height of the nozzle wire pressing module by rotating the adjusting nut, so as to ensure that when being closed, the nozzle upper wire routing wheel and the nozzle wire pressing module are capable of always holding the bare wire tightly and the discharge port is concentric with the cross section of the bare wire, inputting the corresponding wire diameter and the thickness to be coated on the remote controller, automatically setting the feeding speed and the walking speed of the robot by a program in the remote controller, and then, putting the paint tank into the material pushing module and locking the top cover.

Step S10 further comprises step S12 of hanging a thin traction rope: using an unmanned aerial vehicle or crawling robot device, first bringing one end of a thin traction rope to a high place directly through a long insulating rod, turning over the bare overhead wire, and then returning to the ground, then fixing the other end of the thin traction rope with the traction belt, and hanging the traction belt on the bare overhead wire by pulling the thin traction rope. Because the traction belt needs to bear the weight of the robot, the traction belt must have a certain toughness and quality, while the height of the high-voltage cable frame has certain requirements since some bare overhead wires transmit high voltage. The bare overhead wires are generally far from the ground, so that they need longer traction belts, which leads to heavy load of unmanned aerial vehicles or crawling robot devices. However, thin traction ropes are added as buffers. The thin traction ropes only need to bear the weight of the traction belt. The weight of thin traction ropes is light, which reduces the load of unmanned aerial vehicles or crawling robot devices, so that the application range of unmanned aerial vehicles or crawling robot devices is wider.

In step S10, when the traction belt is hung on the overhead bare wire, the traction belt is pulled and adjusted to make the lengths of the traction belts on both sides of the overhead bare wire consistent, the consistent lengths of the traction belts can keep the robot stable and uneasy to turn over when hanging up; in step S20, the walking modules are divided into a front group and a back group, the two groups of walking modules swing in the opposite direction when they rotate and swing, so as to keep the gravity of the robot parallel when it is suspended as much as possible, and form a folded recovery when they rotate and recover; the coating module and the walking module rotate in the direction perpendicular to the extension direction of the overhead bare wire; the step S40 further comprises step S41 of adjusting the nozzle angle: when the nozzle upper wire routing wheel of the coating module and the wire routing wheel of the walking module are clamped on the overhead bare wire, the nozzle of the coating module swings upwards according to the stress deformation of the overhead bare wire, so that the straight line of the axis of the nozzle coincides with the axis of the overhead bare wire; in step S42, adjusting the center of gravity: controlling the angle of the robot by controlling the rolling speed of each winding traction module on the robot, so that the robot tilts according to the actual bending angle of the bare wire, so that the opening range of the coating module is parallel to the upper and lower sides of the bare wire, and the nozzle is clamped on the overhead bare wire more easily; in step S40, the method of controlling the rotation and recovery of the coating module and the walking module is remote manual control or timing automatic starting control.

The present disclosure has the following beneficial effects.

1. The coating robot is provided with a coating module and a walking module which are folded and can automatically rotate around the top of the robot as the axis in the direction perpendicular to the extension direction of the overhead bare wire. First, the traction belt is hung on the overhead bare wire, the winding traction module tightens the traction belt to hang the robot under the overhead bare wires, and finally the coating module and the walking module are controlled to rotate and recover to the top of the robot and hang the robot on the overhead bare wire, so that the robot can be hung on the overhead bare wire by self-traction, avoiding manual climbing up and down or being mounted with the aid of large-scale tools such as insulated bucket truck.

2. The traction belt selected by the robot is made of insulating material and uses an integrated insulating shell. The whole robot has good insulating performance in the operation process, and can work at the same time with or without power failure, so as to have wider applicability.

DETAILED DESCRIPTION OF THE EMBODIMENTS

The present disclosure will be further described hereinafter with reference to specific embodiments and drawings.

As shown in FIGS. 1-9, a self-traction wire coating robot comprises a mounting plate 1, a material pushing module 2, a winding traction module 3, a coating module 4, a walking module 5 and a power supply and control module 6.

Figure 4:
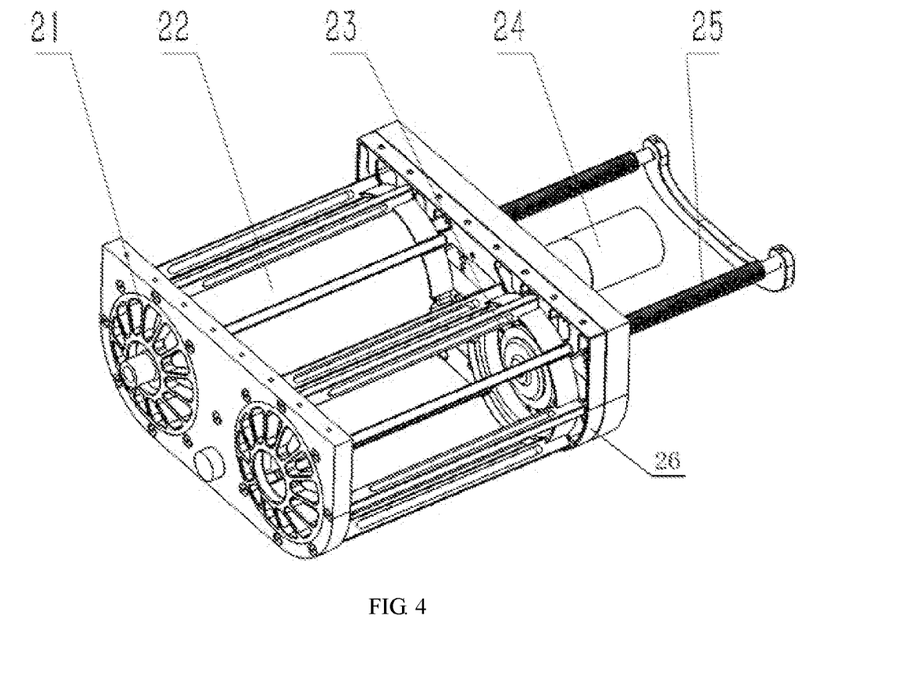
FIG. 4 is a schematic structural diagram of a material pushing module of a self-traction wire coating robot, in which one of the paint tanks is hidden.
Figure 5:
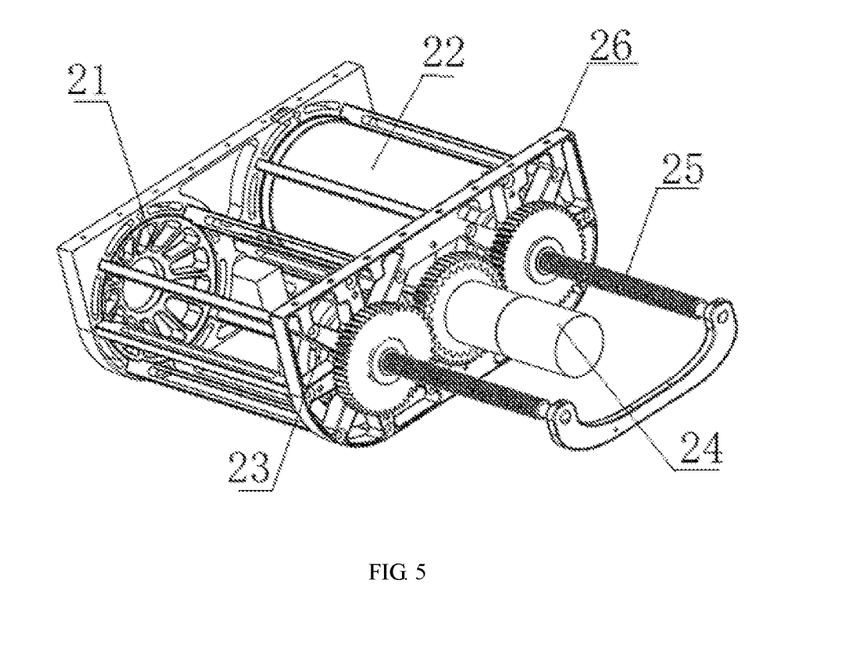
FIG. 5 is a schematic structural diagram of a material pushing module of a self-traction wire coating robot from another angle, in which one of the paint tanks is hidden.

The material pushing module 2 comprises a material cylinder plug 21, a paint tank 22, a material pushing piston 23, a material pushing motor 24, a material pushing screw 25 and a fixing frame 26, the fixing frame 26 is mounted on the lower surface of the mounting plate 1, the material pushing motor 24 is fixedly installed at one side of the fixing frame 26, the power output end of the material pushing motor 24 passes through the fixing frame 26 and drives the material pushing screw rod 25 to stretch back and forth through a gear; the material pushing screw rod 25 is slidably mounted on the fixed frame 26, one end of the material pushing screw rod 25 is fixedly mounted with a material pushing piston 23, the paint tank 22 is mounted in the fixed frame 26 in front of the material pushing piston 23, the material pushing piston 23 is driven by the stretch of the material pushing screw rod 25 to push the inner piston of the paint tank 22, the paint in the paint tank 22 is extruded into a paint pipe, and there are two paint tanks 22, which are respectively connected to the upper spraying head 45 and the lower spraying 46 through the paint pipe.

Figure 6:
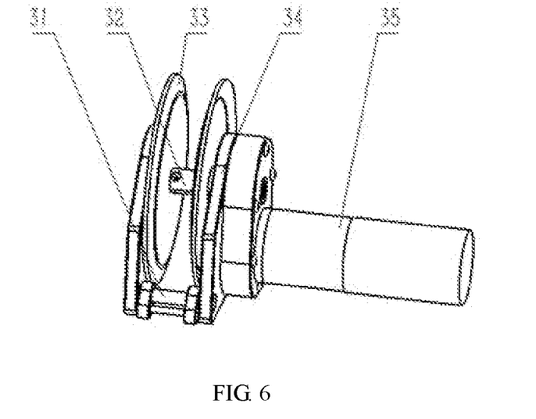
FIG. 6 is an enlarged view of a winding traction module of a self-traction wire coating robot.

There are two groups of winding traction modules 3, each group of winding traction modules 3 comprises two winding traction modules 3 center-symmetrically provided on both sides of the upper surface of the mounting plate 1 through the bracket 34; each winding traction module 3 comprises a correcting shaft 31, a spool 32, a wire blocking disc 33, a bracket 34 and a winding motor 35, the bracket 34 is fixedly mounted on the upper surface of the mounting plate 1, the winding motor 35 is mounted at one side of the bracket 34 and the power output end thereof is in transmission connection with the spool 32 rotatably mounted in the bracket 34 and drives the spool 32 to rotate; the wire blocking disc 33 is fixedly mounted at both ends of the spool 32 and rotate with the rotation of the spool 32; the correcting shaft 31 is fixedly mounted at the lower part of one side of the bracket 34 and is parallel to the spool 32.

Figure 7:
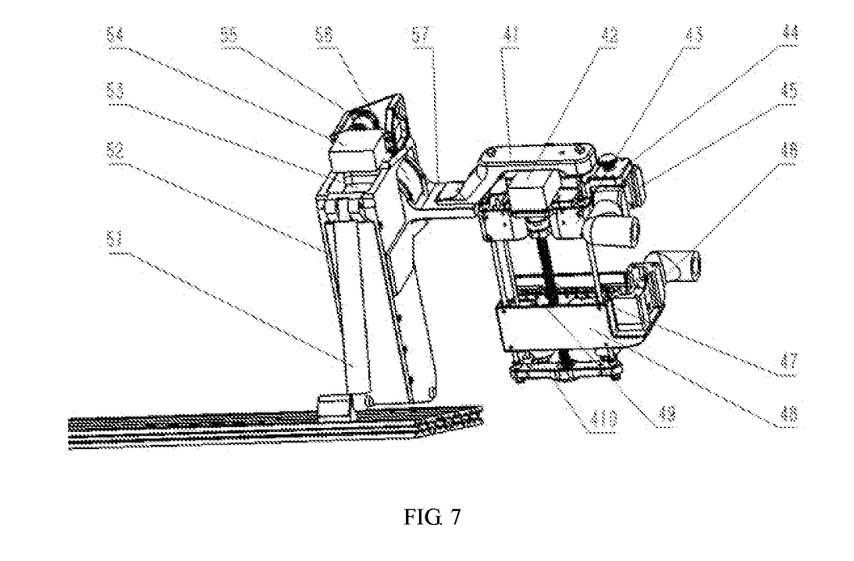
FIG. 7 is an enlarged view of a coating module and a walking module of a self-traction wire coating robot.
Figure 8:
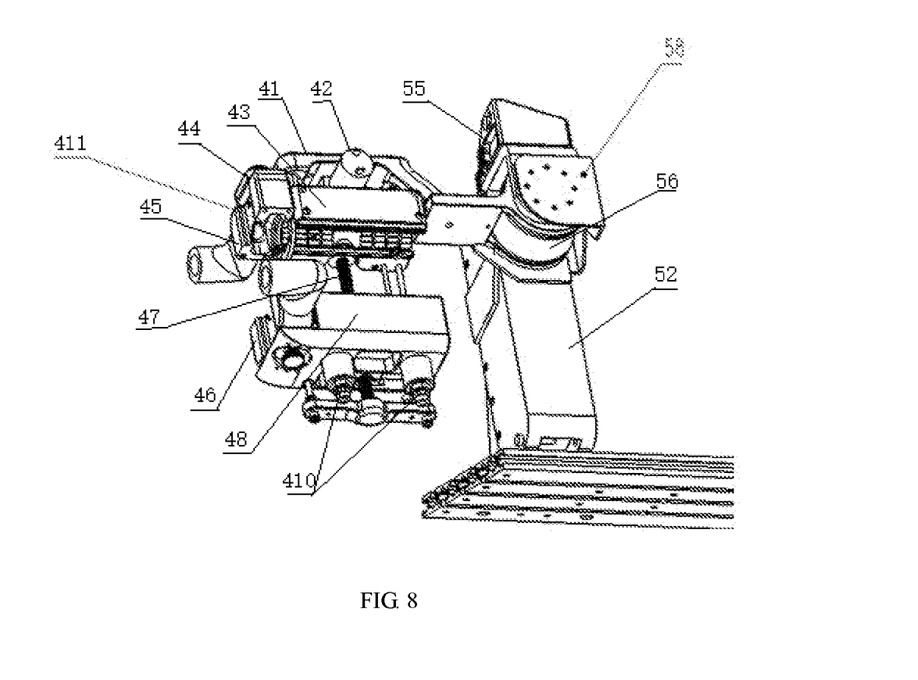
FIG. 8 is an enlarged view of a coating module and a walking module of a self-traction wire coating robot from another angle.

There are two walking modules 5 which are rotatably mounted at both ends of the mounting plate 1 center-symmetrically to each other. Each walking module 5 comprises a telescopic rod 51, a mounting bracket 52, a wire routing motor 53, a wire routing wheel 56 and a wire hanging frame push plate 58. The mounting bracket 52 is in an inverted L shape. The lower end of the mounting bracket is rotatably mounted on the upper surface of the mounting plate 1; the lower end of the telescopic rod 51 is rotatably mounted on the upper surface of the mounting plate 1, the telescopic rod 51 is closer to the edge of the mounting plate 1 in the rotating direction with respect to the mounting bracket 52, the upper end of the telescopic rod 51 is rotatably mounted on the upper part of the side of the mounting bracket 52, the telescopic rod 51 drives the mounting bracket 52 to rotate to one side of the edge of the mounting plate 1 through its own stretch; the wire routing motor 53 is fixedly mounted in the mounting bracket 52, the wire routing wheel 56 is rotatably mounted under the L-shaped cross bar at the top of the mounting bracket 52, the wire routing motor 53 is in transmission connection with the wire routing wheel 56 through a transmission structure and drives the wire routing wheel 56 to rotate, the wire hanging frame push plate 58 is fixedly mounted under the L-shaped cross bar at the top of the mounting bracket 52 and blocks the wire routing wheel 56, and the wire routing wheel 56 limits the overhead bare wires in advance. Each group of walking modules 5 are respectively mounted on both sides of the mounting plate 1 in a staggered manner.

Figure 2:
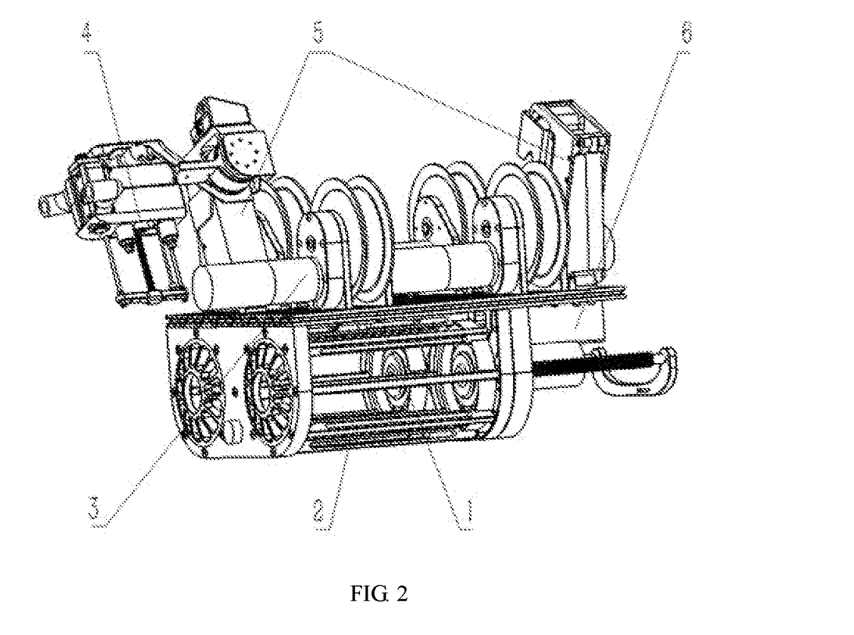
FIG. 2 is a schematic structural diagram of a self-traction wire coating robot without a shell.
Figure 3:
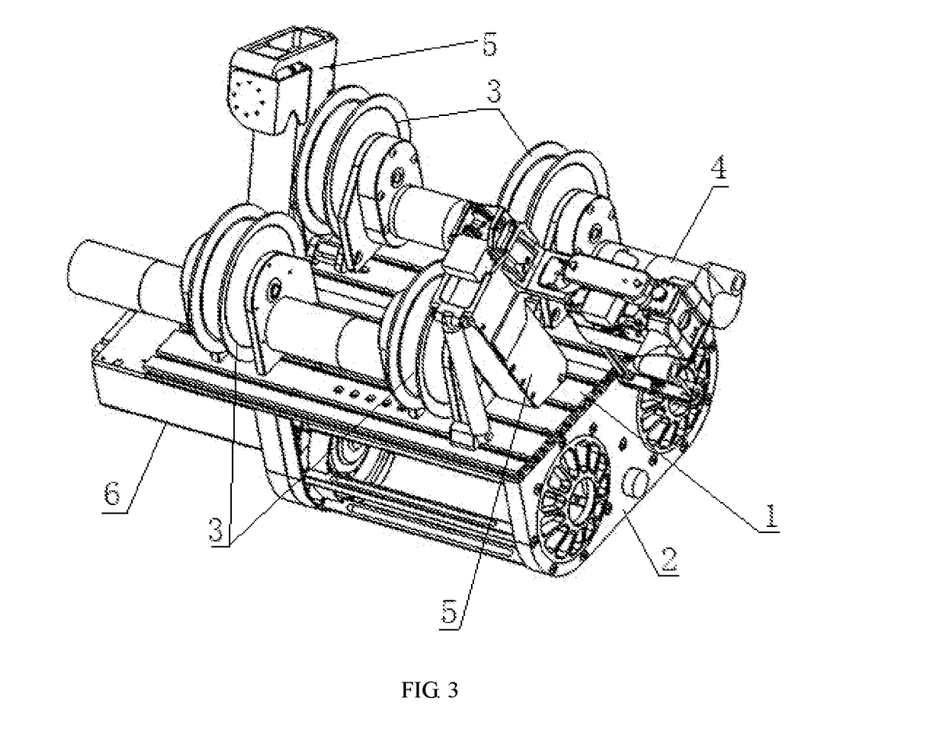
FIG. 3 is a schematic structural diagram of a self-traction wire coating robot without a shell from another angle.

The mounting plate 1 is divided into both sides with the central axis of the wire extending direction, wherein the upper surface of one side is sequentially provided with two winding traction modules 3 and then a walking module 5, and the other side thereof is provided with another two winding traction modules 3 and walking modules 5 center-symmetrically.

A set of mechanisms for controlling the pitch angle of the coating module 4 is further provided on the first walking module 5 at one end of the robot, comprising a pitch motor 54, a nozzle pitch twisting wheel 55 and a coating module mounting frame 57. The pitch motor 54 is mounted on the upper part of the L-shaped cross bar at the top of the mounting bracket 52 and is in transmission connection with the nozzle pitch twisting wheel 55, one side of which is rotatably installed on the mounting bracket 52. The nozzle pitch twisting wheel 55 is provided with a nozzle pitch stay wire, one end of the nozzle pitch stay wire is wound around the nozzle pitch twisting wheel 55, and the other end thereof is fixedly connected to the coating module mounting frame 57 to drive the coating module mounting frame 57 to rotate up and down; one end of the coating module mounting frame 57 is fixedly connected to the mounting seat 41, and the other end thereof is rotatably mounted on the mounting bracket 52 coaxially with the wire routing wheel 56.

The coating module 4 comprise a fixed semi-sprayer and a movable semi-sprayer, the fixed semi-sprayer comprises a mounting seat 41, a nozzle upper wire routing wheel mounting frame 43, a nozzle upper frame 44, an upper spraying head 45 and a nozzle upper wire routing wheel 411; the movable semi-sprayer comprises a lower spraying head 46, a nozzle lower frame 48, a nozzle line pressing module 49 and an adjusting nut 410; the mounting seat 41 is rotatably connected to the mounting bracket 52 of the walking module 5 near one end in the direction of the front end of the robot, the nozzle upper wire routing wheel mounting frame 43 is fixedly mounted below the mounting seat 41, the nozzle upper frame 44 is mounted at the rear end of the nozzle upper wire routing wheel mounting frame 43; the upper spraying head 45 is fixedly mounted on the mounting position at the rear end of the nozzle upper frame 44; the folding motor 42 is fixedly mounted on the upper part of the nozzle upper wire routing wheel mounting frame 43 and is in transmission connection with a folding screw rod 47 to drive the folding screw rod 47 to rotate; the folding screw rod 47 penetrates through the nozzle upper wire routing wheel mounting frame 43 and the nozzle lower frame 48 which is located just below the nozzle upper wire routing wheel mounting frame 43 and is connected to the nozzle lower frame 48 through threads, both sides of the folding screw rod 47 are provided with a limit sliding rod which is parallel to the folding screw rod 47 and penetrates through the nozzle upper wire routing wheel mounting frame 43 and the nozzle lower frame 48, the limit sliding rod is slidably connected to the nozzle lower frame 48, the upper end of the limit sliding rod is fixedly connected to the nozzle upper wire routing wheel mounting frame 43, the folding screw rod 47 is driven by the folding motor 42 to rotate and cooperate with the limit sliding rod, thereby driving the nozzle lower frame 48 to be folded with the nozzle upper frame 44 and realizing the cooperation of the lower spraying head 46 and the upper spraying head 45; the lower spraying head 46 is mounted at the mounting position of the rear end of the nozzle lower frame 48; the nozzle upper wire routing wheel 411 is fixedly mounted in the nozzle upper wire routing wheel mounting frame 43, the nozzle wire pressing module 49 is movably mounted in the nozzle lower frame 48 up and down, the nozzle upper wire routing wheel 411 and the nozzle wire pressing module 49 are respectively slidably connected to the upper part and the lower part of the bare wire when in operation; the adjusting nut 410 is connected to the nozzle lower frame 48 through thread penetration, the top of the adjusting nut 410 is in contact with the top of the nozzle wire pressing module 49, and the adjusting nut 410 adjusts the height of the nozzle wire pressing module 49 through a screw.

Figure 9:
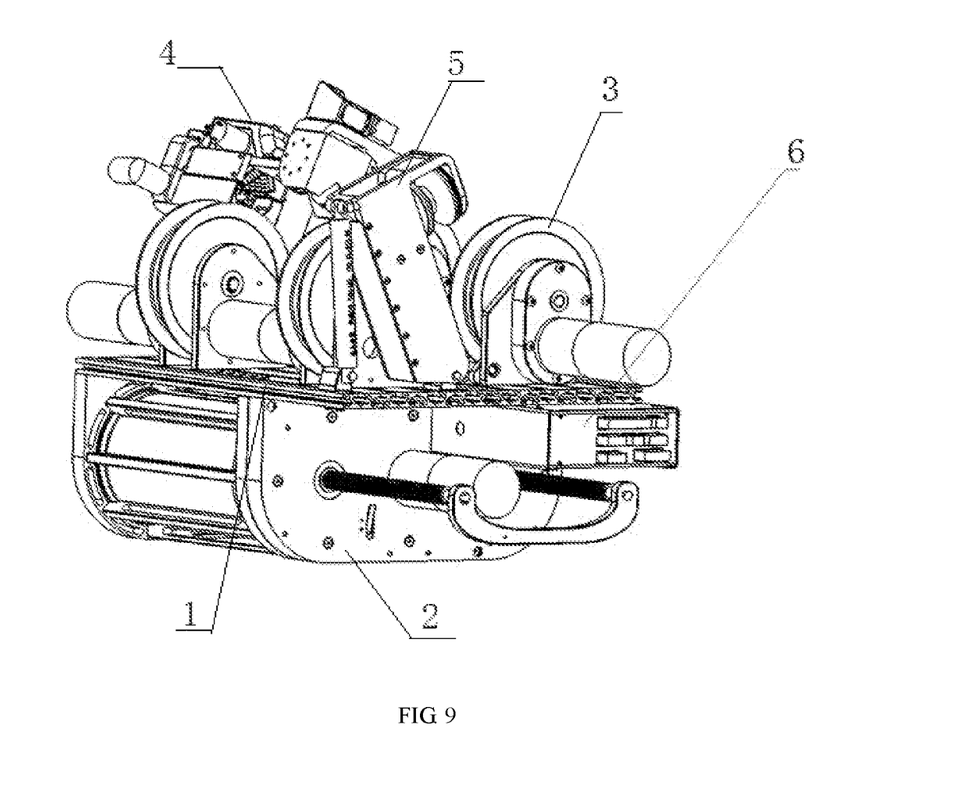
FIG. 9 is an enlarged view of the structure of a power supply and control module of a self-traction wire coating robot without shell.

The power supply and control module 6 is fixedly provided on the mounting plate 1. The power supply and control module 6 comprises a wireless communication module and a microprocessor. The microprocessor is communicatively connected to the wireless communication module, the material pushing module 2, the winding traction module 3, the coating module 4 and the walking module 5 and is communicated with an electronic device of each module, and controls the operation of each module in coordination. The wireless communication module is connected to the remote controller through wireless signals.

In one embodiment, the self-traction wire coating robot further comprises a wireless communication module and a microprocessor, which are mounted in the power supply and control module 6. The microprocessor is communicatively connected to the wireless communication module, the material pushing module 2, the winding traction module 3, the coating module 4 and the walking module 5 and is communicated with an electronic device of each module, and controls the operation of each module in coordination. The wireless communication module is connected to the remote controller through wireless signals.

Figure 1:
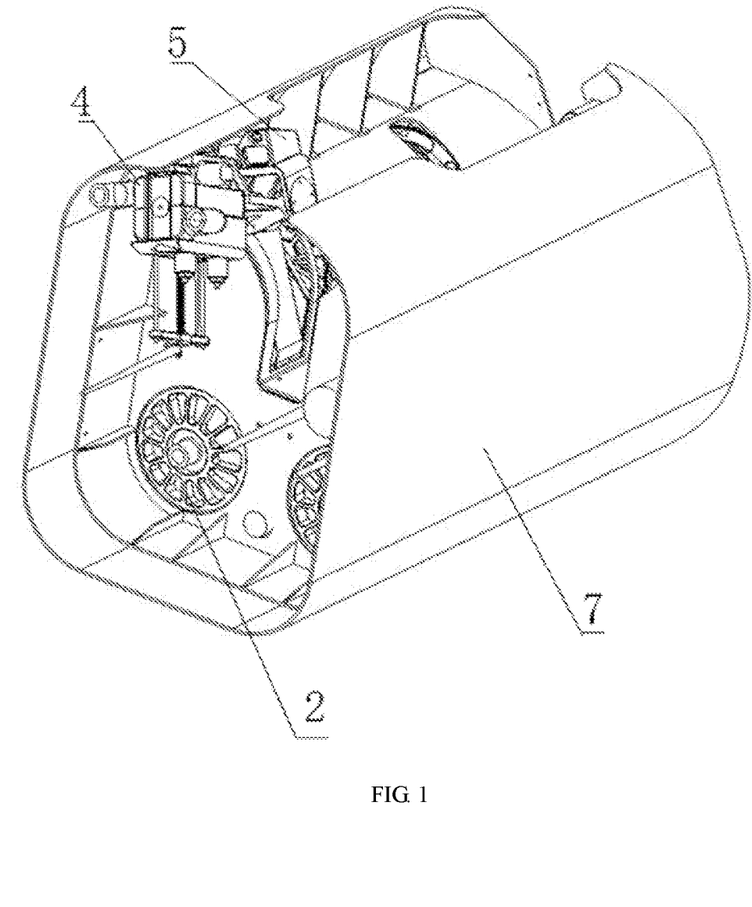
FIG. 1 is a schematic structural diagram of a self-traction wire coating robot with a shell.

In one embodiment, the self-traction wire coating robot further comprises a shell 7, which is fixedly mounted on the mounting plate 1 and wrapped outside the whole robot.

The above self-traction wire coating robot uses the following wire routing and wire hanging method, in which the coating module 4 and the walking module 5 which can automatically rotate in the extension direction of non-overhead bare wires are provided on the mounting plate 1 of the coating robot, and then the winding traction module 3 is added on the mounting plate 1, the coating module 4 and the walking module 5 are first rotated and swung to the side of the robot, an unmanned device is used or the traction belt is directly hung on the overhead bare wire through a long insulating rod, the traction belt is tightened using the winding traction module 2 to hang the robot under the overhead bare wires, and finally the walking module 4 and the walking module 5 are controlled to rotate and recover to the top of the robot, then the traction belt is released until the nozzle of the coating module 4 and the wire routing wheel 56 of the walking module 5 are completely clamped to the wire, and the robot is hung on the overhead bare wire, comprising the following detailed steps:

step S11, preparation before coating: according to the situation of the overhead bare wire and the coating robot, selecting a suitable nozzle and adjusting the height of the nozzle wire pressing module 49 by rotating the adjusting nut 410, so as to ensure that when being closed, the nozzle upper wire routing wheel 411 and the nozzle wire pressing module 49 are capable of always holding the bare wire tightly and the discharge port is concentric with the cross section of the bare wire, inputting the corresponding wire diameter and the thickness to be coated on the remote controller, automatically setting the feeding speed and the walking speed of the robot by a program in the remote controller, and then, putting the paint tank into the material pushing module 2 and locking the top cover;

S10, hanging a thin traction rope: using an unmanned aerial vehicle, first bringing one end of a thin traction rope to a high place, turning over the bare overhead wire, and then returning to the ground, then fixing the other end of the thin traction rope with the traction belt, hanging the traction belt on the bare overhead wire by pulling the thin traction rope, then fixing both ends of the traction belt to the winding traction module 3, and pulling and adjusting the traction belt to make the lengths of the traction belts on both sides of the bare overhead wire consistent;

S20, preparation before hanging: rotating and swinging the coating module 4 and the walking module 5 to the side of the robot, and turning on the nozzle of the coating module 4, and connecting the discharge port in the material pushing module 2 to a paint interface of the coating module 4 using a paint pipe;

S30, hanging: starting the winding traction module 3 to tighten the traction belt, so that the robot rises below the overhead bare wire with the tightening of the traction belt, and the nozzle upper wire routing wheel 411 of the coating module 4 and the wire routing wheel 56 of the walking module 5 are higher than the overhead bare wire;

S40, wire routing: controlling the coating module 4 and the walking module 5 to rotate and recover right above the overhead bare wire, and gradually releasing the traction belt by the winding traction module 3 so that the nozzle upper wire routing wheel 411 and the wire routing wheel 56 are clamped on the overhead bare wire, swinging the nozzle of the coating module 4 upwards according to the stress deformation of the overhead bare wire, so that the straight line of the axis of the nozzle coincides with the axis of the overhead bare wire, and folding the nozzle lower frame 48 of the coating module 4 until the upper spraying head 45 and the lower spraying head 46 are folded, starting the material pushing module 2 and the walking module 5, and spraying the overhead bare wire through the cooperation of the material pushing module 2 and the walking module 5.

In one embodiment, step S40 comprises step S42 of adjusting the center of gravity in the process of recovery of the coating module 4: controlling the angle of the robot by controlling the rolling speed of each winding traction module 3 on the robot, so that the robot tilts according to the actual bending angle of the bare wire, so that the opening range of the coating module 4 is parallel to the upper and lower sides of the bare wire, and the nozzle is clamped on the overhead bare wire more easily.

In one embodiment, in step S20, the walking modules 5 are divided into a front group and a back group, the two groups of walking modules swing in the opposite direction when they rotate and swing, so as to form a folded recovery when they rotate and recover; the coating module 4 and the walking module 5 rotate in the direction perpendicular to the extension direction of the overhead bare wire; in step S40, the method of controlling the rotation and recovery of the coating module 4 and the walking module 5 is remote manual control or timing automatic starting control.

The above embodiment only expresses one embodiment of the present disclosure, which is described specifically in detail, but it cannot be understood as limiting the patent scope of the present disclosure. It should be pointed out that for those skilled in the art, several changes and improvements can be made without departing from the concept of the present disclosure, which fall within the scope of protection of the present disclosure. Therefore, the scope of protection of the patent of the present disclosure should be subject to the appended claims.

The invention claimed is:

1. A self-traction wire coating robot, comprising a mounting plate (1), a material pushing module (2), a winding traction module (3), a coating module (4), a walking module (5) and a power supply and control module (6);
   wherein the winding traction module (3) further comprising a spool (32) driven by a winding motor (35) and a bracket (34); wherein the winding traction module (3) is fixed on the upper surface of the mounting plate (1) through the bracket (34);
   wherein the walking module (5) further comprising a wire routing wheel (56) driven by a wire routing motor (53) and a mounting bracket (52), wherein the walking module (5) is rotatably provided on the upper surface of the mounting plate (1) through the mounting bracket (52);
   wherein the coating module (4) further comprising a pair of semi-sprayers which are fixedly or rotatably mounted on a first walking module (5) at one end of the self-traction wire coating robot or on the mounting plate (1) through a mounting seat (41), and the pair of semi-sprayers are driven by a folding motor (42) to be folded with each other to form a sprayer;
   wherein the material pushing module (2) is fixedly provided on the mounting plate (1) and is communicated with the pair of semi-sprayers of the coating module (4) through paint pipes; wherein the power supply and control module (6) is fixedly provided on the mounting plate (1) and is electrically connected to the material pushing module (2), the winding traction module (3), the coating module (4) and the walking module (5).

2. The self-traction wire coating robot according to claim 1, wherein a plurality of groups of winding traction modules (3) are provided, each group of winding traction modules (3) further comprising two winding traction modules (3) symmetrically or center-symmetrically provided on both sides of the upper surface of the mounting plate (1); wherein each winding traction module (3) further comprising a correcting shaft (31), a spool (32), a wire blocking disc (33), a bracket (34) and a winding motor (35), wherein the bracket (34) is fixedly mounted on the upper surface of the mounting plate (1), wherein the winding motor (35) is mounted at one side of the bracket (34) and an power output end is of the winding motor is connected with the spool (32) rotatably mounted in the bracket (34) and drives the spool (32) to rotate; wherein the wire blocking disc (33) is fixedly mounted at both ends of the spool (32) and rotate with the spool (32); wherein the correcting shaft (31) is fixedly mounted at the lower part of one side of the bracket (34) and is parallel to the spool (32).

3. The self-traction wire coating robot according to claim 1, wherein a plurality of walking modules (5) are rotatably mounted at both ends of the mounting plate (1) symmetrically or center-symmetrically, wherein each said walking module (5) further comprising a telescopic rod (51), a mounting bracket (52), a wire routing motor (53), a wire routing wheel (56) and a wire hanging frame push plate (58), wherein a lower end of the mounting bracket (52) is rotatably mounted on an upper surface of the mounting plate (1); wherein a lower end of the telescopic rod (51) is rotatably mounted on the upper surface of the mounting plate (1), wherein the telescopic rod (51) is closer to the edge of the mounting plate (1) in the rotating direction than the mounting bracket (52), wherein an upper end of the telescopic rod (51) is rotatably mounted on an upper part of a side of the mounting bracket (52), wherein the telescopic rod (51) drives the mounting bracket (52) to rotate to one side of edge of the mounting plate (1); wherein the wire routing motor (53) is fixedly mounted in the mounting bracket (52), wherein the wire routing wheel (56) is rotatably mounted on the top of the mounting bracket (52), wherein the wire routing motor (53) is connected with the wire routing wheel (56) through a transmission structure and drives the wire routing wheel (56) to rotate; wherein the wire hanging frame push plate (58) is fixedly mounted on top of the mounting bracket (52) and blocks the wire routing wheel (56), and wherein the wire routing wheel (56) limits an overhead bare wires.

4. The self-traction wire coating robot according to claim 1, wherein the pair of semi-sprayers comprising a fixed semi-sprayer and a movable semi-sprayer, wherein the fixed semi-sprayer further comprising a mounting seat (41), a nozzle upper wire routing wheel mounting frame (43), a nozzle upper frame (44), an upper spraying head (45) and a nozzle upper wire routing wheel (411); wherein the movable semi-sprayer further comprising a lower spraying head (46), a nozzle lower frame (48), a nozzle line pressing module (49) and an adjusting nut (410); wherein the mounting seat (41) is rotatably connected to the mounting bracket (52) of the walking module (5) near one end in the direction of the front end of the self-traction wire coating robot, wherein the nozzle upper wire routing wheel mounting frame (43) is fixedly mounted below the mounting seat (41), wherein the nozzle upper frame (44) is mounted at the rear end of the nozzle upper wire routing wheel mounting frame (43); wherein the upper spraying head (45) is fixedly mounted on the mounting position at the rear end of the nozzle upper frame (44); wherein the folding motor (42) is fixedly mounted on an upper part of the nozzle upper wire routing wheel mounting frame (43) and is connected with a folding screw rod (47) to drive the folding screw rod (47) to rotate; wherein the folding screw rod (47) penetrates through the nozzle upper wire routing wheel mounting frame (43) and the nozzle lower frame (48) which is located below the nozzle upper wire routing wheel mounting frame (43) and is connected to the nozzle lower frame (48) through threads, wherein one side or both sides of the folding screw rod (47) are provided with a limit sliding rod which is parallel to the folding screw rod (47) and penetrates through the nozzle upper wire routing wheel mounting frame (43) and the nozzle lower frame (48), wherein the limit sliding rod is slidably connected to the nozzle lower frame (48), wherein the upper end of the limit sliding rod is fixedly connected to the nozzle upper wire routing wheel mounting frame (43), wherein the folding screw rod (47) is driven by the folding motor (42) to rotate and cooperate with the limit sliding rod, thereby driving the nozzle lower frame (48) to be folded with the nozzle upper frame (44) and enable the lower spraying head (46) and the upper spraying head (45) to engage; wherein the lower spraying head (46) is mounted at the mounting position of the rear end of the nozzle lower frame (48); wherein the nozzle upper wire routing wheel (411) is fixedly mounted in the nozzle upper wire routing wheel mounting frame (43), wherein the nozzle wire pressing module (49) is movably mounted in the nozzle lower frame (48), wherein the nozzle upper wire routing wheel (411) and the nozzle wire pressing module (49) are respectively slidably connected to an upper part and a lower part of the bare wire; wherein the adjusting nut (410) is connected to the nozzle lower frame (48) through thread penetration, wherein top of the adjusting nut (410) is in contact with top of the nozzle wire pressing module (49), and wherein the adjusting nut (410) adjusts the height of the nozzle wire pressing module (49) through a screw.

5. The self-traction wire coating robot according to claim 1, wherein the power supply and control module (6) further comprising a wireless communication module and a microprocessor, wherein the microprocessor is communicatively connected to the wireless communication module, wherein the material pushing module (2), the winding traction module (3), the coating module (4) and the walking module (5) and is communicated with an electronic device in each module, and controls the operation of each module, wherein the wireless communication module is connected to a remote controller through wireless signals; wherein the material pushing module (2) further comprising a material cylinder plug (21), a paint tank (22), a material pushing piston (23), a material pushing motor (24), a material pushing screw (25) and a fixing frame (26), the fixing frame (26) is mounted on the lower surface of the mounting plate (1), wherein the material pushing motor (24) is fixedly installed at one side of the fixing frame (26), wherein the power output end of the material pushing motor (24) passes through the fixing frame (26) and drives the material pushing screw rod (25) to stretch back and forth through a gear; wherein the material pushing screw rod (25) is slidably mounted on the fixed frame (26), wherein one end of the material pushing screw rod (25) is fixedly mounted with a material pushing piston (23), wherein the paint tank (22) is mounted in the fixed frame (26) in front of the material pushing piston (23), wherein the material pushing piston (23) is driven by the stretch of the material pushing screw rod (25) to push the inner piston of the paint tank (22), wherein the paint in the paint tank (22) is extruded into a paint pipe; wherein the paint tank (22) of the material pushing module (2) is provided with a paint pipe, and wherein the paint pipe is connected to the paint inlet of a pair of semi-sprayers of the coating module (4).

6. The self-traction wire coating robot according to claim 1, further comprising a pitch motor (54), a nozzle pitch twisting wheel (55) and a coating module mounting frame (57), wherein the pitch motor (54) is mounted on the top of the mounting bracket (52) of the first walking module (5) at one end of the self-traction wire coating robot and is in transmission connection with the nozzle pitch twisting wheel (55), wherein one side of which is rotatably installed on the mounting bracket (52); wherein the nozzle pitch twisting wheel (55) is provided with a nozzle pitch stay wire, wherein one end of the nozzle pitch stay wire is wound around the nozzle pitch twisting wheel (55), and another end thereof is fixedly connected to the coating module mounting frame (57) to drive the coating module mounting frame (57) to rotate up and down; wherein one end of the coating module mounting frame (57) is fixedly connected to the mounting seat (41), and another end thereof is rotatably mounted on the mounting bracket (52) coaxially with the wire routing wheel (56) of the walking module (5).

\* \* \* \* \*